(12) United States Patent
Liu

(10) Patent No.: US 6,515,652 B2
(45) Date of Patent: Feb. 4, 2003

(54) TACTILE POINTING STICK

(75) Inventor: Jia Hung Liu, Taipei Hsien (TW)

(73) Assignee: Darfon Electronics Corp., Taoyuan (TW)

(*) Notice: Subject to any disclaimer, the term of this patent is extended or adjusted under 35 U.S.C. 154(b) by 137 days.

(21) Appl. No.: 09/793,461

(22) Filed: Feb. 26, 2001

(65) Prior Publication Data

US 2001/0022576 A1 Sep. 20, 2001

(30) Foreign Application Priority Data

Mar. 14, 2000 (TW) .................................. 89204033 U

(51) Int. Cl.[7] ................................................ G09G 5/00
(52) U.S. Cl. ...................... 345/161; 345/157; 345/168
(58) Field of Search ................................. 345/156, 161, 345/163, 168, 160, 157, 159, 701, 702; 341/20–23, 37

(56) References Cited

U.S. PATENT DOCUMENTS 6,140,998 A * 10/2000 Slotta ......................... 345/161
6,271,834 B1 * 8/2001 May et al. ................... 345/168
6,400,354 B1 * 6/2002 Pin-Chien ................... 345/161

* cited by examiner

*Primary Examiner*—Bipin Shalwala
*Assistant Examiner*—Mansour M. Said
(74) *Attorney, Agent, or Firm*—Ladas & Parry

(57) ABSTRACT

A tactile pointing stick is provided. A dome-shaped cap, having a convex portion, is additionally disposed between an outer cap and an adapter of a traditional pointing stick. Hence, when a user operates such tactile pointing stick, he can feel feedback, generated by the dome-shaped cap, and operate the tactile pointing stick more precisely. Furthermore, a hard plate is additionally mounted in the pointing stick to ensure the tactile function.

13 Claims, 4 Drawing Sheets

TACTILE POINTING STICK

BACKGROUND OF THE INVENTION

1. Field of the Invention

The invention relates to a tactile pointing stick; in particular, the invention relates to a tactile pointing stick capable of generating a tactile function.

2. Description of the Related Art

In general, the input and output data processing of a computer are carried out interactively with a user via a data input/output device. For example, the data input device may be a keyboard or a pointing device, while the data output device is may be a display screen of a computer that displays such data as characters and graphics. Examples of pointing device include a pointing stick, a digitizer, a mouse, and a track ball.

In recent years, it has become even more popular to use the pointing device, in addition to the keyboard, as the data input device to apply in fields such as data processing. The reason for the popular use of the pointing device can be attributed to the newfound convenience brought by operating systems and application software that employs a free-to-move pointer in response to interactive operations by a user for which the use of the pointing device is essential. For example, Windows operations and icon operations are examples of the interactive operations.

On the other hand, computers today are no longer limited to the bulky desktop type having an independent computer body, keyboard, and display monitor. Recently, portable computers such as the laptop type, notebook type and palm type have become popular, and such portable computers have an integrated computer body, keyboard, and display. The portable computer such as the laptop type can be conveniently carried because it is light and compact.

However, because of the increasing popularity of using such portable computers as the laptop type, the operating condition under which the pointing device is incorporated into a computer has become more diversified. In other words, the pointing device of a desktop type computer is typically operated on the top of a desk while the pointing device for the portable computer is more compact and operable away from the desk.

For this reason, it is desirable that the pointing device used with the portable computer does not require a setup area because the pointing device is integrated with the portable computer. In addition, there is also demand to reduce the setup area of the pointing device of portable computers, where it is more desirable to assemble the pointing device within the computer in order to meet such demand.

The operating theorem of the pointing stick is described as follows. When an operator pushes the pointing stick in an arbitrary direction, a strain dependent on the strain of the pointing stick generated by the force is generated at each strain gauge. Since the resistance of the strain gauge is in proportion to the degree of the strain engaged thereupon, it is possible to determine the moving direction and moving distance of the cursor or pointer on the display screen, based on the changes in the resistance of each of the strain gauges, by detecting the change in the resistance of each strain gauge.

The structure of a traditional pointing stick 10 is shown in FIG. 1. The pointing stick 10 consists of a substrate 11, a post 12, and a rubber cap 14. The substrate 11 is provided with a circuit (not shown) in order to transmit the signal of strain gauges (not shown), disposed on the substrate 11 or the post 12, to a controlled object, for example, the cursor described above. The post 12 is disposed on the substrate 11, and it is used for being subjected to an external force from the user. The rubber cap 14 is disposed on the post 12.

After the user moves the cursor to a desired position through the pointing stick 10, he can activate the pointing stick 10, like the mouse, by pressing its tip end.

Among all kinds of pointing sticks, some of the posts 12 may consist of a body 121 and an adapter 122. Accordingly, the rubber cap 14 is disposed on the adapter 122.

However, since the rubber cap and the post or the adapter are abutted against each other directly without any interface, the user cannot be sure whether his force can activate the pointing stick or not when he presses the tip end of the pointing stick. As a result, the user feels very troubled.

SUMMARY OF THE INVENTION

In view of the disadvantages of the aforementioned conventional pointing stick, the invention provides a tactile pointing stick that can generate a tactile feedback to users.

Accordingly, the tactile pointing stick of the invention comprises a substrate, a post, a first cap and a second cap. The post has a first end, disposed on the substrate, and a second end being free. The first cap, having an inner bottom surface, is disposed on the post. The second cap, having a convex portion, is disposed between the inner bottom surface of the first cap and the second end of the post in a manner that the convex portion abuts the post.

Furthermore, the tactile pointing stick further comprises a hard plate disposed between the inner bottom surface of the first cap and the second cap.

Furthermore, the post further comprises an adapter, being disposed on the second end of the post and abutting the convex portion.

In addition, the tactile pointing stick of the invention comprises a substrate, a post, a first cap and a second cap. The post has a first end, disposed on the substrate, and a second end being free. The first cap is disposed on the post. The second cap, having a convex portion, is disposed between the first cap and the second end of the post in a manner that the convex portion abuts the first cap.

BRIEF DESCRIPTION OF THE DRAWINGS

The invention is hereinafter described in detail by reference to the accompanying drawings in which.

DETAILED DESCRIPTION OF THE INVENTION

First Embodiment

Figure 1:
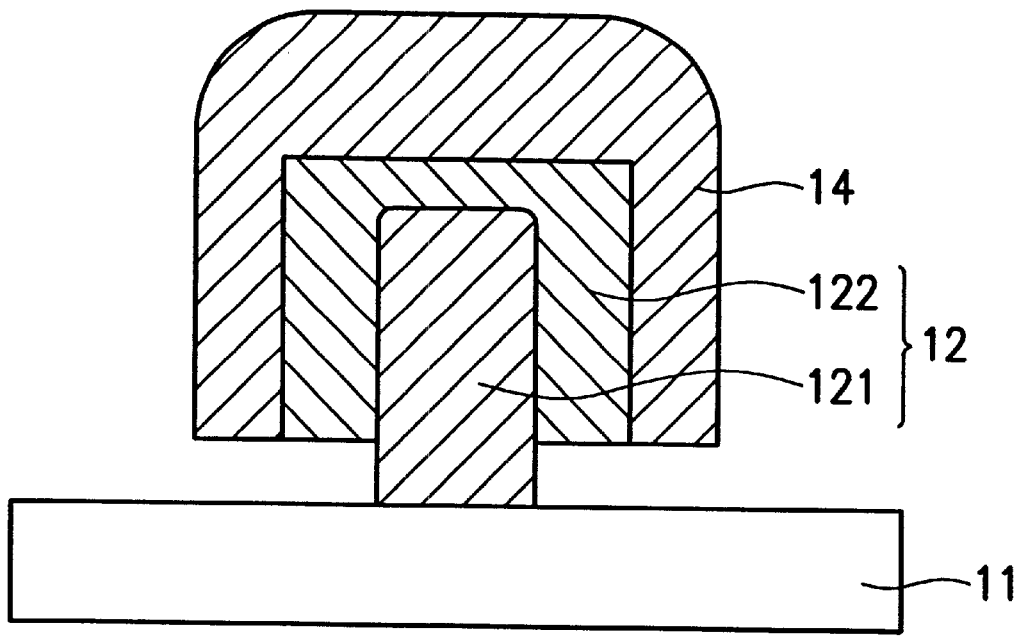
FIG. 1 is a schematic view depicting a conventional pointing stick.
Figure 2A:
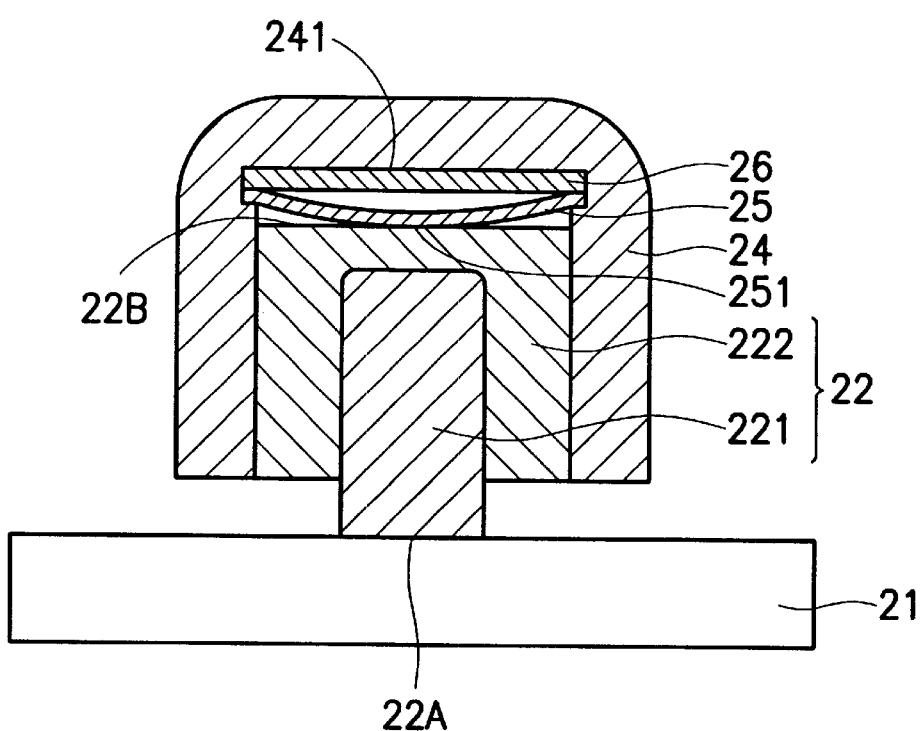
FIG. 2a is a schematic view depicting a first embodiment of a tactile pointing stick of the invention.

The structure of a tactile pointing stick 20 of a first embodiment of the invention is shown in FIG. 2a and FIG.

2b. The tactile pointing stick 20 comprises a substrate 21, a post 22, a first cap 24, a second cap 25 and a hard plate 26. The post 22 comprises a body 221 and an adapter 222. The adapter 222, fitting the body 221, is used as a mount when the first cap 24 is disposed on the body 221. The post 22, disposed on the substrate 21 with a first end 22A and a second end 22B being free is used for receiving an external force from a user. The substrate 21 is provided with a circuit (not shown) in order to transmit the signal of strain gauges (not shown), disposed on the substrate 21 or the post 22, to a controlled object. The first cap 24, having an inner bottom surface 241, is disposed on the top surface of the second end 22B of the post 22.

Figure 3A:
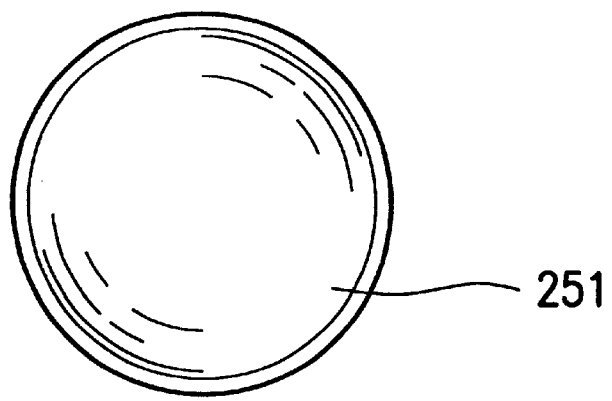
FIG. 3a is a top view of the second cap of the first embodiment of the invention.
Figure 3B:
FIG. 3b is a front view of the second cap of the first embodiment of the invention.

The difference between the traditional pointing stick and the tactile pointing stick of the present embodiment is that the second cap 25 and the hard plate 26 are additionally disposed between the inner bottom surface 241 of the first cap 24 and the adapter 222. As shown in FIG. 3a and FIG. 3b, the second cap 25, made of elastic material, is dome-shaped. Also, the second cap 25 is provided with a convex portion 251 in its central portion so that it can abut the adapter 222 through the convex portion 251.

Furthermore, since most of the first caps 24 are made of soft material, such as rubber, the problem that the user cannot confirm whether he presses the second cap 25 through the first cap 24 or not may occur. Therefore, the hard plate 26 is additionally disposed between the inner bottom surface 241 of the first cap 24 and the second cap 25 in order to generate the tactile feedback to the user accurately.

Figure 2B:
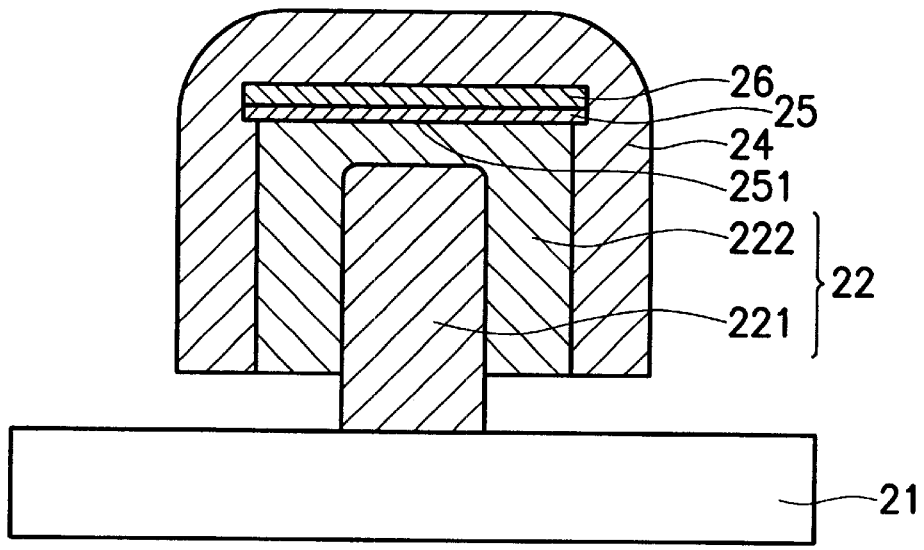
FIG. 2b is a schematic view depicting the first embodiment of the tactile pointing stick of the invention, wherein a second cap is subjected to an external force.

By means of additionally mounting the second cap 25 and the hard plate 26, when the user presses the tactile pointing stick, the convex portion 251 of the second cap 25 moves downward, as shown in FIG. 2b. When the second cap 25 is deformed, it generates a reacting force to the user. As a result, the user can sense the tactile feedback and operate the tactile pointing stick more precisely.

Second Embodiment

Figure 4A:
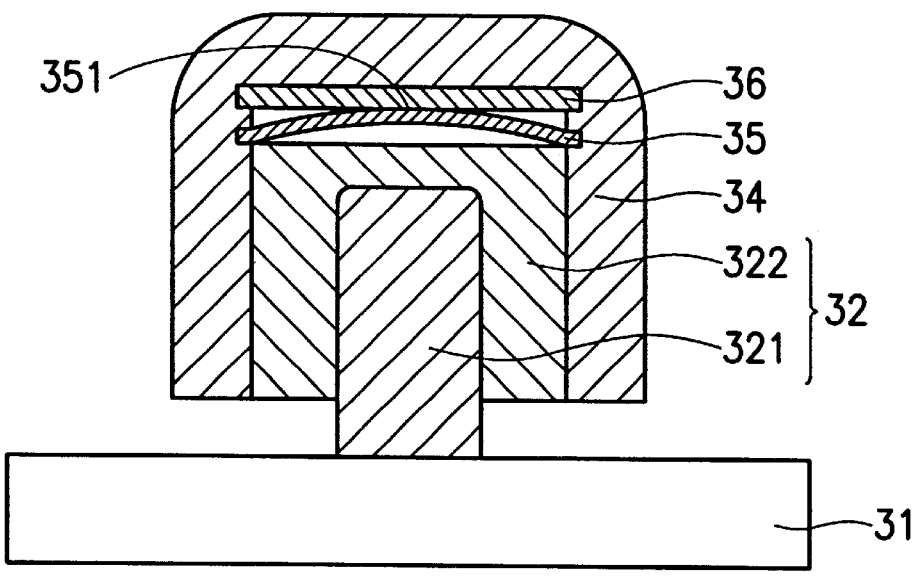
FIG. 4a is a schematic view depicting a second embodiment of a tactile pointing stick of the invention.
Figure 4B:
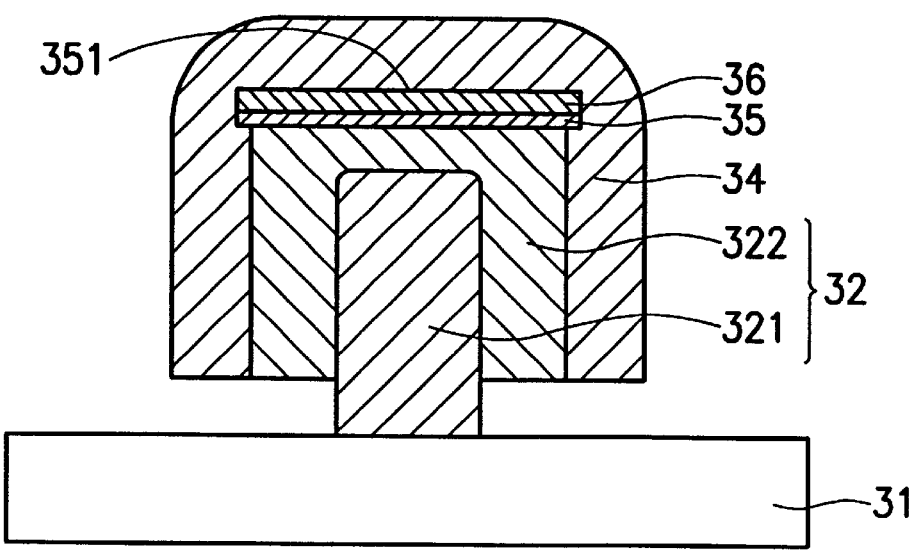
FIG. 4b is a schematic view depicting the second embodiment of the tactile pointing stick of the invention, wherein a second cap is subjected to an external force.

The structure of a tactile pointing stick 30 of a second embodiment of the invention is shown in FIG. 4a and FIG. 4b. The tactile pointing stick 30 comprises a substrate 31, a post 32, a first cap 34, a second cap 35 and a hard plate 36. The post 32 comprises a body 321 and an adapter 322, and the second cap 35 is provided with a convex portion 351. Among the parts of such tactile pointing stick, the position and the function of the substrate 31, the post 32, the first cap 34 and the hard plate 36 of the present embodiment are the same with the first embodiment; therefore, their description is omitted.

The difference between the present embodiment and the first embodiment is that the convex portion 351 of the second cap 35 abuts the hard plate 36.

By means of additionally mounting the second cap 35 and the hard plate 36, when the user presses the tactile pointing stick 30, the convex portion 351 of the second cap 35 moves downward, as shown in FIG. 4b. When the second cap 35 is deformed, it generates a reacting force to the user. As a result, the user can sense the tactile feedback and operate the tactile pointing stick more precisely.

In addition, it is noted that the adapters 222, 322 of the posts 22, 32 of the tactile pointing sticks 20, 30 of the present invention are used as mounts when the first caps 24, 34 are disposed on the bodies 221, 321. Therefore, as long as the size of the bodies 221, 321 are big enough to fit the first caps 24, 34, the second caps 25, 35 and the hard plate 26, 36, the adapters 222, 322 can be omitted.

While the invention has been particularly shown and described with reference to a preferred embodiment, it will be readily appreciated by those of ordinary skill in the art that various changes and modifications may be made without departing from the spirit and scope of the invention. It is intended that the claims be interpreted to cover the disclosed embodiment, those alternatives which have been discussed above, and all equivalents thereto.

What is claimed is:

1. A tactile pointing stick, comprising:

a substrate;

a post having a first end, affixed on the substrate, and a second end, being free;

a first cap disposed, having an inner bottom surface, on the second end of the post; and a second cap, having a convex portion, disposed between the inner bottom surface and the second end of the post in a manner that the convex portion abuts the top surface of the second end of the post.

2. The tactile pointing stick as claimed in claim 1, further comprising a hard plate disposed between the inner bottom surface of the first cap and the second cap.

3. The tactile pointing stick as claimed in claim 2, wherein the post further comprises an adapter, and the adapter is disposed between the top surface of the second end of the post and the second cap.

4. A tactile pointing stick, comprising:

a substrate;

a post, having a first end, affixed on the substrate, and a second end being free;

a first cap, having an inner bottom surface, disposed on the second end of the post; and a second cap, having a convex portion, disposed between the inner bottom surface of the first cap and the second end of the post in a manner that the convex portion abuts the inner bottom surface of the first cap.

5. The tactile pointing stick as claimed in claim 4, further comprising a hard plate disposed between the inner bottom surface of the first cap and the second cap.

6. The tactile pointing stick as claimed in claim 5, wherein the post further comprises an adapter, and the adapter is disposed between the top surface of the second end of the post and the second cap.

7. A tactile device of a pointing stick, wherein the pointing stick comprises a substrate and a post disposed on the substrate with a first end and a second end being free, and the tactile device comprises:

a first cap having an inner bottom surface, disposed on the second end of the post; and a second cap, having a convex portion, disposed between the inner bottom surface of the first cap and the second end of the post.

8. The tactile device of a pointing stick as claimed in claim 7, wherein the second cap is made of elastic material, and the convex portion is dome-shaped.

9. The tactile device of a pointing stick as claimed in claim 8, wherein the second cap is disposed between the inner bottom surface of the first cap and the second end of the post in a manner that the convex portion abuts the top surface of the second end of the post.

10. The tactile device of a pointing stick as claimed in claim 9, further comprising a hard plate disposed between the inner bottom surface of the first cap and the second cap.

11. The tactile device of a pointing stick as claimed in claim 10, wherein the post further comprises an adapter, and the adapter is disposed between the top surface of the second end of the post and the second cap.

12. The tactile device of a pointing stick as claimed in claim 8, wherein the second cap is disposed between the inner bottom surface of the first cap and the top surface of the second end of the post in a manner that the convex portion abuts the inner bottom surface of the first cap.

13. The tactile device of a pointing stick as claimed in claim 12, further comprising a hard plate disposed between the inner bottom surface of the first cap and the second cap.

* * * * *